US012793252B2

(12) United States Patent
Park et al.

(10) Patent No.: US 12,793,252 B2
(45) Date of Patent: Nov. 10, 2026

(54) METHOD OF PREDICTING A POSITION OF AN OBJECT AT A FUTURE TIME POINT FOR A VEHICLE

(71) Applicants: HYUNDAI MOTOR COMPANY, Seoul (KR); KIA CORPORATION, Seoul (KR); Ewha University—Industry Collaboration Foundation, Seoul (KR)

(72) Inventors: Hyung-Wook Park, Seoul (KR); Jang-Ho Shin, Yongin-si (KR); Seo-Young Jo, Seoul (KR); Je-Won Kang, Seoul (KR); Jung-Kyung Lee, Seoul (KR)

(73) Assignees: HYUNDAI MOTOR COMPANY, Seoul (KR); KIA CORPORATION, Seoul (KR); Ewha University—Industry Collaboration Foundation, Seoul (KR)

( * ) Notice: Subject to any disclaimer, the term of this patent is extended or adjusted under 35 U.S.C. 154(b) by 626 days.

(21) Appl. No.: 18/125,371

(22) Filed: Mar. 23, 2023

(65) Prior Publication Data

US 2024/0127470 A1 Apr. 18, 2024

(30) Foreign Application Priority Data

Oct. 18, 2022 (KR) ........................ 10-2022-0133839

(51) Int. Cl.
*G06T 7/70* (2017.01)
*B60W 50/00* (2006.01)
(Continued)

(52) U.S. Cl.
CPC ........... *G06T 7/70* (2017.01); *B60W 50/0097* (2013.01); *B60W 60/0027* (2020.02);
(Continued)

(58) Field of Classification Search
CPC ..... G06T 7/11; G06T 7/12; G06T 7/70; G06T 2207/10024; G01S 17/86; G01S 17/89;
(Continued)

(56) References Cited

U.S. PATENT DOCUMENTS 11,810,364 B2 * 11/2023 RoyChowdhury .......................... G01C 21/3822
11,960,290 B2 * 4/2024 Laddha ............ B60W 60/0027
(Continued)

OTHER PUBLICATIONS

Scheel et al., "Tracking Multiple Vehicles Using a Variational Radar Model," in IEEE Transactions on Intelligent Transportation Systems, vol. 20, No. 10, pp. 3721-3736, Oct. 2019, accessed on Aug. 8, 2025 via <https://ieeexplore.ieee.org/document/8533431> (Year: 2019).*

(Continued)

*Primary Examiner* — John Villecco
*Assistant Examiner* — Joshua B. Crockett
(74) *Attorney, Agent, or Firm* — Lempia Summerfield Katz LLC

(57) ABSTRACT

In a method of predicting a position of an object at a future time point for a vehicle, video image information at a current time point and at a plurality of time points before the current time point acquired through a camera of the vehicle may be extracted as semantic segmentation image. A mask image imaging an attribute and position information of an object present in each of the video images may be extracted. A position distribution of the object may be predicted by deriving a plurality of hypotheses for a position of the object at a future time point through deep learning by receiving video images at the current time point and the time points before the current time point, a plurality of semantic segmentation images, a plurality of mask images, and ego-motion information of the vehicle, and calculating the plu- (Continued)

rality of hypotheses as a Gaussian mixture probability distribution.

11 Claims, 17 Drawing Sheets

(51) Int. Cl.

| | |
|---|---|
| ***B60W 60/00*** | (2020.01) |
| ***G01S 17/86*** | (2020.01) |
| ***G01S 17/89*** | (2020.01) |
| ***G01S 17/931*** | (2020.01) |
| ***G06T 7/11*** | (2017.01) |
| ***G06T 7/12*** | (2017.01) |
| ***G06V 10/10*** | (2022.01) |
| ***G06V 20/58*** | (2022.01) |

(52) U.S. Cl.

CPC .............. *G01S 17/86* (2020.01); *G01S 17/89* (2013.01); *G01S 17/931* (2020.01); *G06T 7/11* (2017.01); *G06T 7/12* (2017.01); *G06V 10/16* (2022.01); *G06V 20/58* (2022.01); *G06T 2207/10024* (2013.01)

(58) Field of Classification Search

CPC ...... G01S 17/931; G06V 10/16; G06V 20/58; B60W 50/0097; B60W 60/0027; B60W 60/00276

See application file for complete search history.

(56) References Cited

U.S. PATENT DOCUMENTS

2020/0089246 A1* 3/2020 McGill, Jr. .............. G06N 3/08
2021/0150230 A1* 5/2021 Smolyanskiy ......... G06V 10/82
2023/0154198 A1* 5/2023 Makansi ................ G06V 10/82 382/103

OTHER PUBLICATIONS

Buhet et al. "PLOP: Probabilistic polynomial Objects trajectory Planning for autonomous driving", arXiv.org, Oct. 2020, accessed Aug. 8, 2025 via <https://arxiv.org/abs/2003.08744> (Year: 2020).*

Wen et al., "Three-Attention Mechanisms for One-Stage 3-D Object Detection Based on LiDAR and Camera," in IEEE Transactions on Industrial Informatics, vol. 17, No. 10, pp. 6655-6663, Oct. 2021, accessed on Aug. 8, 2025 via <https://ieeexplore.ieee.org/document/9312480?source=IQplus> (Year: 2021).*

G. Boesch, "Everything About Mask R-CNN: A Beginner's Guide", viso.ai, Mar. 19, 2022, Accessed on Aug. 7, 2025 via <https://viso.ai/deep-learning/mask-r-cnn/> (Year: 2022).*

Deng, David, and Avideh Zakhor. "Temporal LiDAR Frame Prediction for Autonomous Driving." 020 International Conference on 3D Vision (3DV). IEEE, 2020. 9pp.

Fang, Liangji, et al. "TPNet: Trajectory Proposal Network for Motion Prediction." IEEE/CVF Conference on Computer Vision and Pattern Recognition. 2020. 10pp.

Kawasaki, Atsushi, and Akihito Seki. "Multimodal Trajectory Predictions for Autonomous Driving without a Detailed Prior Map." IEEE/CVF Winter Conference on Applications of Computer Vision. 2021. 10pp.

Makansi, Osama, et al. "Multimodal Future Localization and Emergence Prediction for Objects in Egocentric View with a Reachability Prior." IEEE/CVF Conference on Computer Vision and Pattern Recognition. 2020. 10pp.

Peri, Neehar, et al. "Forecasting from LiDAR via Future Object Detection." IEEE/CVF Conference on Computer Vision and Pattern Recognition. 2022. 10pp.

* cited by examiner

METHOD OF PREDICTING A POSITION OF AN OBJECT AT A FUTURE TIME POINT FOR A VEHICLE

CROSS-REFERENCE TO RELATED APPLICATION

This application claims the benefit of and priority to Korean Patent Application No. 10-2022-0133839, filed on Oct. 18, 2022, is the entire contents of which are incorporated herein by reference.

FIELD

The present disclosure relates to a method of predicting a position of an object at a future time point for controlling a predictive operation of a vehicle.

BACKGROUND

As autonomous ranges of vehicles gradually increase, safety requirements for vehicles in emergency situations are also increasing. To meet the higher safety requirements, risk prevention and prediction technology based on intelligent image signal analysis in complex and various unexpected situations has been employed. Efficient responses and stability of the vehicles for preventing accidents may be increased by performing preemptive predictions about other vehicles and pedestrians in surrounding environments using various sensor data such as images and 3D information, Therefore, various methods for future object prediction in the vehicles have been proposed.

In one such method, a multimodal prediction based on prior map information and route information uses a prior map to predict future routes of surrounding vehicles. Previous studies have presented a deep neural network model for prediction using a detailed prior map including traveling lanes and explicitly expressing road rules such as valid routes through intersections. However, because it is practically impossible to explicitly express all road rules for all regions, a generator-based generative adversarial network (GAN) framework has been proposed. A discriminator determines whether predicted trajectories follow the road rules, and the generator predicts trajectories which follow the predicted trajectories.

Another proposed prediction method utilizes an egocentric view, where the egocentric view refers to image information from the driver's point of view at a current position of a vehicle. When the egocentric view is acquired using a single-view RGB camera, there is a problem in that the driver's view has a partial and narrow viewing angle. In addition, there is a problem of a view change over time from the egocentric view due to an ego-motion indicating a traveling direction of the vehicle. To solve the problem, a method of predicting future positions of other vehicles and pedestrians from the egocentric view has been proposed. The prediction problem is solved by learning a prior at a position where an object may be present at a future time. Instead of obtaining external information such as map information, the prior at a position where a class of an object detected in the image may be present is learned using information analyzed from a current image. In addition, a learning model is established to calculate a probability distribution for a position where an object may appear suddenly in the next scene.

Another study which developed a method of predicting a multipath of a pedestrian using RGB images from an egocentric view, as illustrated in FIG. 1. The study predicts routes by receiving pedestrian's past routes and sizes as well as RGB images. When considering the pedestrian's past routes from the egocentric view, a resulting future route distribution includes multiple routes. Therefore, multimodal prediction suffers from a multiple-to-one mapping due to multi-pedestrian route prediction. The problem is solved using conditional variational autoencoders (CVAE). Since a CVAE model models a distribution of a high-dimensional output space, a network for coupling the CVAE model with a recurrent neural network (RNN) encoder-decoder structure has been proposed.

Referring now to FIG. 2, in a multimodal method using route information and road information, various routes may be present when a future route is determined. The route may be predicted in consideration of surrounding situations and objects in addition to the determination of the vehicle. To reduce the number of possible route search cases, an approximate future last position is predicted. Based on the approximate future last position, routes are generated and then selected by hypothesis of the possible future routes.

Referring now to FIG. 3, a data processing method based on a point pillar structure using light detection and ranging (LiDAR) information has been proposed. The point pillar structure refers to a structure obtained in a process of converting three-dimensional point cloud information into a two-dimensional pseudo image. In the conventional study, point cloud information was divided into units called voxels like pixels in an image, and features of the voxels were used as input to a three-dimensional convolutional neural network (CNN). The proposed method solves the problem of point cloud data sparsely distributed in each voxel by processing continuous point cloud data using information converted into fillers or voxels and calculating only voxels with sufficient information.

Referring now to FIG. 4, another study developed a deep neural network structure for detecting the object based on the LiDAR sensor and predicting the future position of the object based on the result. Instead of the method of detecting the position in the current frame and predicting the future position, the problem is reviewed by the future object detection method, and the position of the future object is predicted from a starting point of each trajectory. Multiple futures are estimated by connecting the future and present positions in a multiple-to-one manner.

Referring now to FIG. 5, another proposed method utilizes a neural network model for predicting the previously given future LiDAR frame. Information on the motion between times of LiDAR data is generated through a FlowNet3D model for predicting the motion between point clouds.

The contents of this background section are intended to promote an understanding of the background of the present disclosure and may include matters which are not previously known to those having ordinary skill in the art to which the present disclosure pertains.

SUMMARY

The present disclosure is directed to providing a method of predicting a position of an object at a future time point using multimodal synthesis in an autonomous vehicle. In an embodiment, future prediction may be performed by mixing future predictions of various modals. In an example, future prediction may be performed by synthesizing various information (multimodal) which may be acquired from a vehicle to determine a current accident in future prediction of each modal and predicting a future motion based on the determined current accident.

According to an embodiment of the present disclosure, a method of predicting a future position of an object in an autonomous vehicle includes: extracting, by a processor, a video image acquired through a camera of the autonomous vehicle; extracting, by the processor, the video image as a semantic segmentation image; extracting, by the processor, a mask image imaging an attribute and position information of an object present in the video image; mixing, by the processor, the video image, the semantic segmentation image, the mask image, and ego-motion information of the vehicle; predicting, by the processor, a position distribution of the object for deriving a plurality of hypotheses for a prediction position of the object at the future time point; performing, by the processor, a fitting using learned data with respect to the plurality of hypotheses derived by predicting the position distribution of the object; generating, by the processor, a mixture model.

In an aspect, the video image information may be a wide view image obtained by extracting and stitching two or more video image information acquired through the camera of the vehicle.

In an aspect, the wide view image may be an RGB two-dimensional (2D) image, the method may include predicting routes using a multi-view synthesizing the RGB 2D image and LiDAR information based on an egocentric view.

In an aspect, the method may further include generating the mixture model by mixing output values of an RGB 2D model based on the video image, the semantic segmentation image, and the mask image and a LiDAR model based on the LiDAR information.

In an aspect, the method may further include generating a Gaussian mixture probability distribution using the mixture model.

In an aspect, predicting the position distribution of the object may include mixing (synthesizing) a final vector from the video image and a final vector from the LiDAR information using a deep learning-attention mechanism.

In an aspect, the method may include generating the mixture model by mixing the plurality of hypotheses and an output value of a LiDAR model based on the LiDAR information.

In an aspect, the ego-motion information of the vehicle may include information corresponding to a current time point t and a future time point ($t+\Delta t$).

In an aspect, the video image, the semantic segmentation image, and the mask image mixed may be extracted for a current time point t and a plurality of past time points.

In an aspect, the method may further include, prior to extracting the video image acquired through the camera of the vehicle, predicting a position of the object, wherein predicting the position of the object includes deriving a plurality of hypotheses from a video image extracted at a current time point t acquired through the camera of the vehicle.

In an aspect, mixing the video image, the semantic segmentation image, the mask image, and the ego-motion information of the vehicle further includes mixing the plurality of hypotheses.

In an aspect, predicting the position of the object may include deriving the plurality of hypotheses including one or more of the video images extracted at the current time point t acquired through the camera of the traveling vehicle, the semantic segmentation image extracted at the current time point t, and the ego-motion information of the vehicle.

Various embodiments of the present disclosure are based on the object future prediction network. Embodiments of the present disclosure i) perform multi-view synthesis using the multi-view provided by the LiDAR, ii) perform object future prediction using the synthesized multi-view, and iii) perform multimodal prediction using the image information and the LiDAR information. In some embodiments, methods such as a structure of adding the multimodal and an attention structure may be utilized when multiple modals are mixed. Further, a final synthesis method using the probability distribution may be performed. Therefore, it is possible to overcome the limitation of the image information of the limited viewing angle and effectively mix the multimodal through the proposed attention structure between the modal.

Therefore, it is possible to efficiently predict the future position of the object.

In addition, it is possible to increase the safety of the autonomous vehicle and predict and prevent the risks in unexpected situations during autonomous traveling.

As described above, using embodiments of the present disclosure, it is possible to improve the efficient response and stability of the autonomous vehicle by performing the preemptive prediction.

More specifically, it is possible to implement more efficient response using a sensor signal for comprehensively detecting the image with the wide viewing angle through the multi-view synthesis and the omni-directional environment in addition to the image of the conventional egocentric view camera with the narrow viewing angle together. In various embodiments, autonomous vehicles can accurately detect the situations and support the quick response using various types of high-performance camera sensors, LiDAR technologies, radars, and the like that may continually monitor 360 degrees around the vehicle. Embodiments may utilize the sensor hardware and electronic devices to create synergy by mixing and coupling intelligent software.

BRIEF DESCRIPTION OF THE DRAWINGS

The above and other objects, features and advantages of the present disclosure may be more apparent from the following detailed description taken in conjunction with the accompanying drawings, in which.

DETAILED DESCRIPTION

To fully understand the present disclosure, the operational advantages of the present disclosure, and the objects achieved by carrying out the present disclosure, reference should be made to the accompanying drawings showing embodiments of the present disclosure and the contents described in the accompanying drawings.

In describing the embodiments of the present disclosure, descriptions of well-known techniques or repetitive descriptions which may unnecessarily obscure the gist of the present disclosure will be reduced or omitted.

Figure 6:
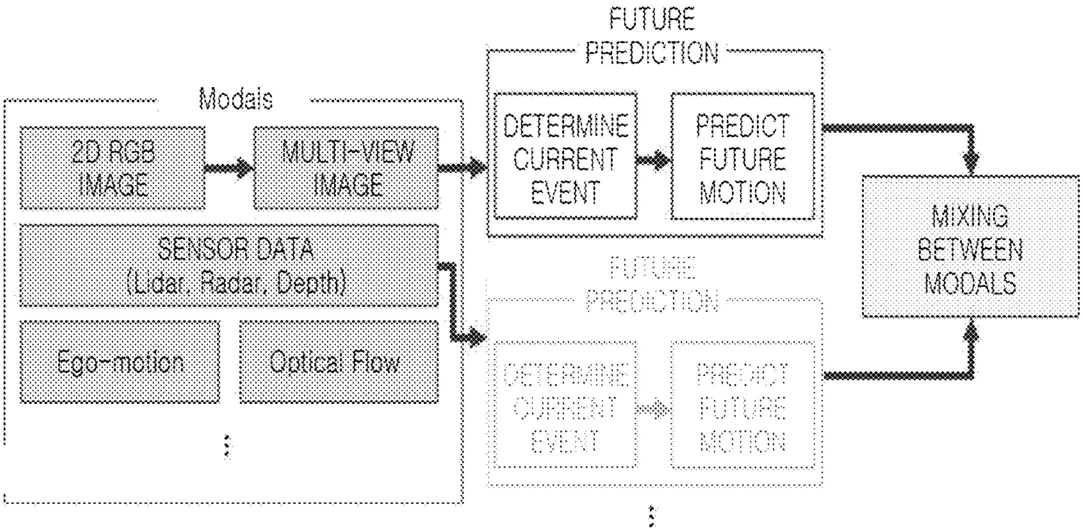
FIG. 6 schematically shows a prediction method according to an embodiment of the present disclosure.

FIG. 6 schematically shows a method according to an embodiment of the present disclosure.

Figure 7:
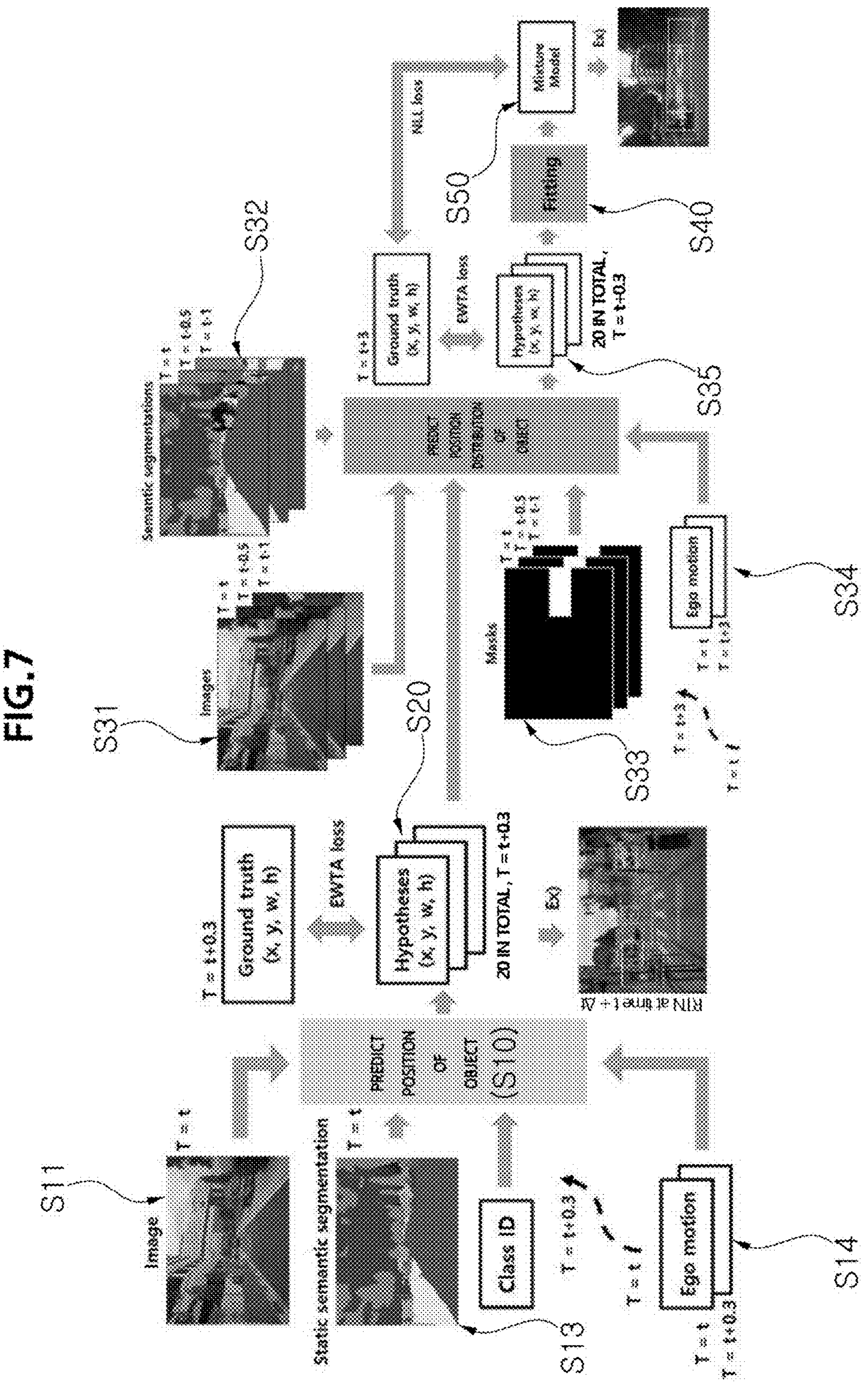
FIG. 7 is a view showing a method of predicting a position and position distribution of an object, according to an embodiment of the present disclosure.
Figure 8:
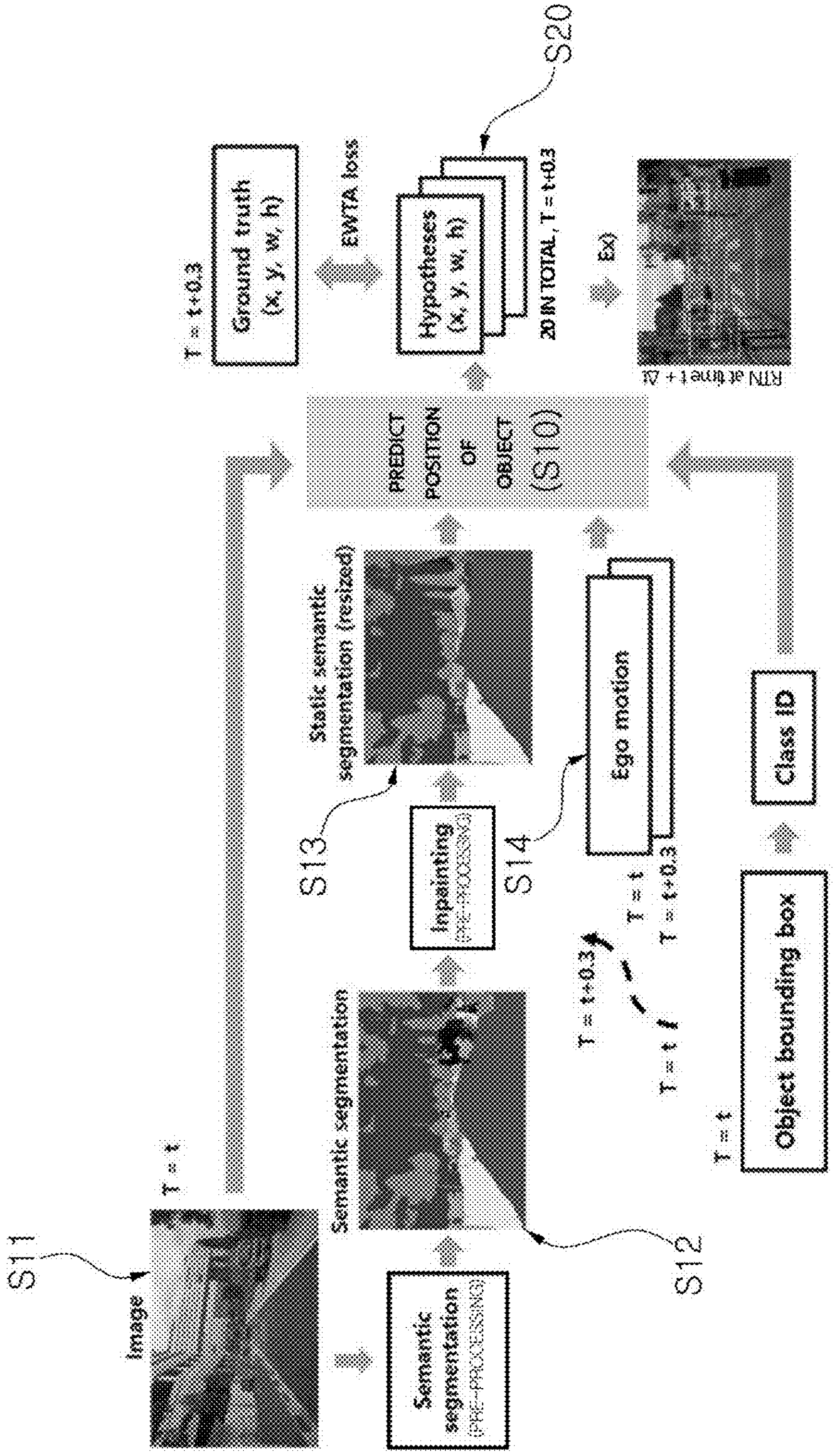
FIG. 8 is a view showing the method of predicting the position of the object according to an embodiment of the present disclosure in more detail.
Figure 9:
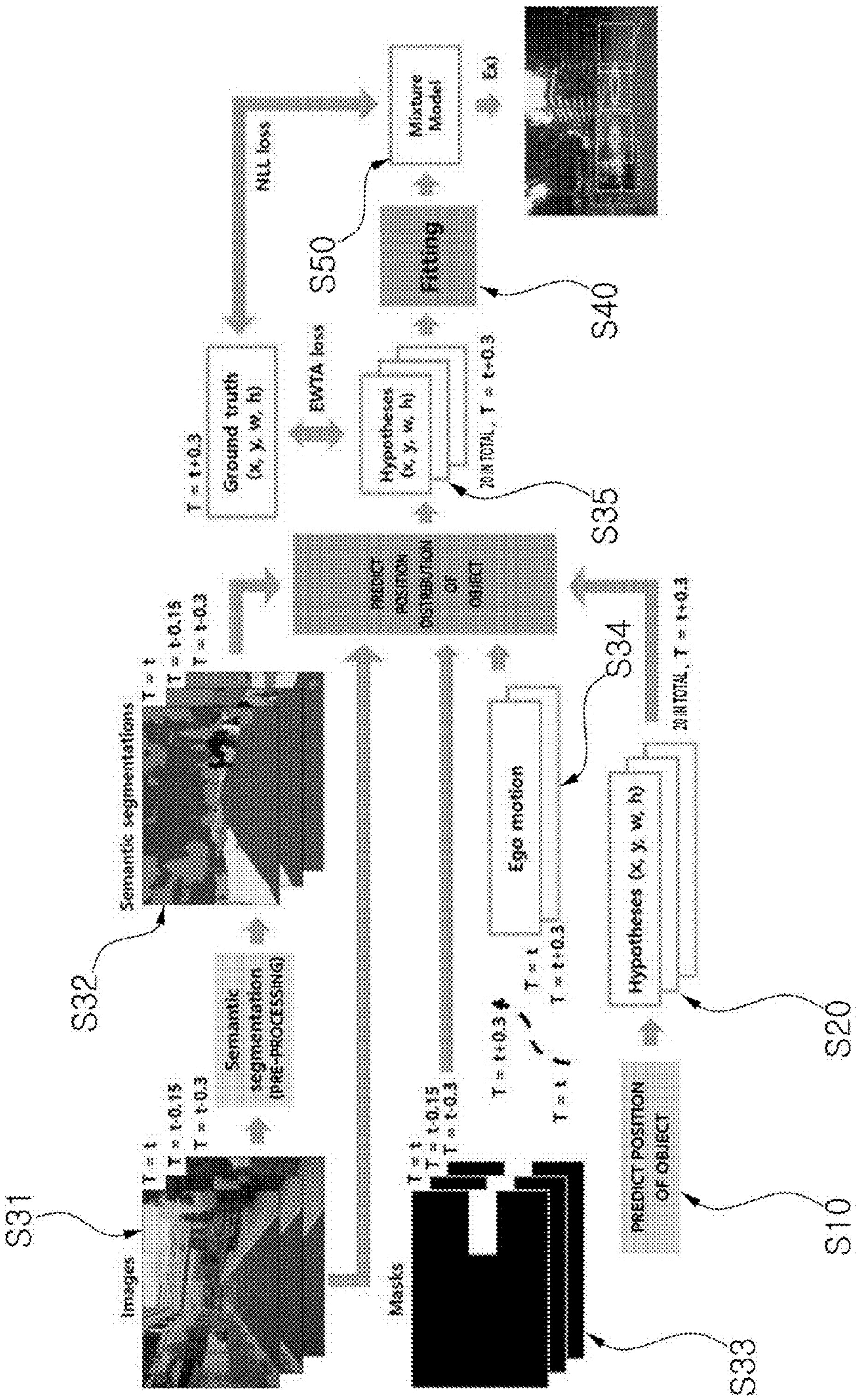
FIG. 9 is a view showing the method of predicting the position distribution of the object according to an embodiment of the present disclosure in more detail.

FIG. 7 is a view showing a method of predicting a position and position distribution of an object according to an embodiment of the present disclosure. FIG. 8 is a view showing the method of predicting the position of the object according to the present disclosure in more detail, and FIG. 9 is a view showing the method of predicting the position distribution of the object according to an embodiment of the present disclosure in more detail.

Figure 10:
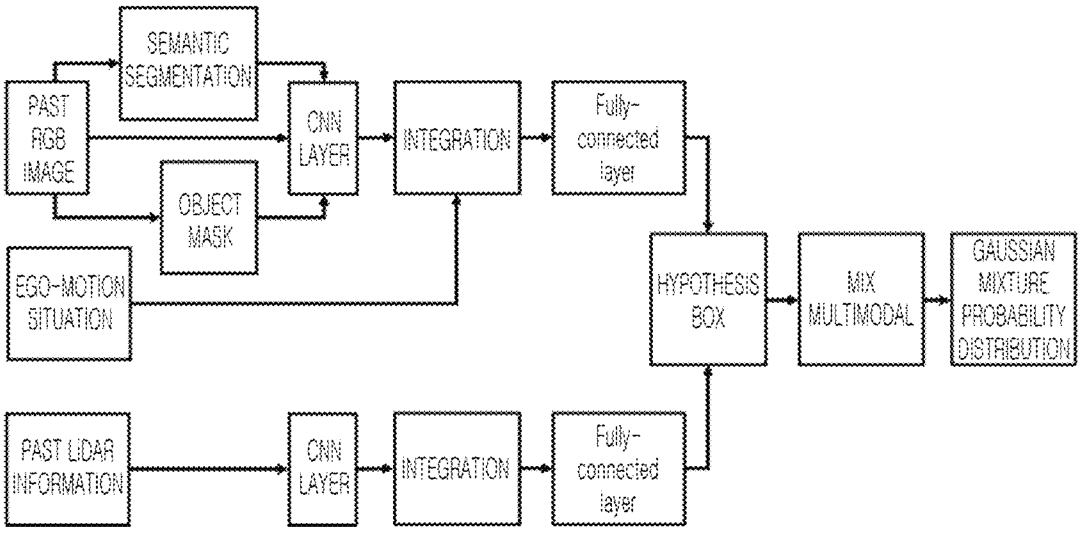
FIG. 10 schematically shows a method of predicting a position of an object at a future time point using multimodal synthesis for an autonomous vehicle, according to an embodiment of the present disclosure.

FIG. 10 schematically shows a method of predicting a position of an object at a future time point using multimodal synthesis for an autonomous vehicle, according to an embodiment of the present disclosure.

Hereinafter, a method of predicting a position of an object at a future time point using multimodal synthesis for an autonomous vehicle, according to an embodiment of the present disclosure, is described with reference to FIGS. 6 to 10.

The present disclosure provides a method of predicting a motion and probability of appearance of an object appearing at a future time in an egocentric view of a vehicle by combining various analysis information of images extracted from RGB images, change information over time, LiDAR information, and the like including two-dimensional RGB image information acquired from the front of the vehicle.

Conventional methods of predicting the future position of the object include a method using image information of a bird's-eye view or an egocentric view. However, there is a problem in that data required for processing becomes too vast when the bird's-eye view is used. In addition, the image information of the egocentric view has a limited viewing angle.

To overcome the problem, the present disclosure proposes a method using a wide viewing angle by stitching images of RGB two-dimensional (2D) information and proposes a multi-view synthesis mixing the RGB 2D information with the wide viewing angle and the LiDAR information for predicting the future motion of the object.

The conventional method predicts routes using multi-view synthesis performed based on a map prepared as prior information. On the other hand, in the present disclosure, as shown in FIG. 6, future motion of an object is predicted using multi-view synthesis performed based on an egocentric view of a wide viewing angle. In addition, the present disclosure describes a method of mixing two different modals, when LiDAR information and RGB 2D information are mixed. In a conventional system, a method of predicting a future position using a single modal or simply adding a final prediction result probability when each modal is converged is used. On the other hand, embodiments of the present disclosure may predict the future by synthesizing LiDAR and RGB information through an attention calculation in one deep learning structure.

As shown in FIG. 6, in a method of predicting the future according to an embodiment of the present disclosure, the future may first be predicted using one of multiple modals. As a type of modal, data detected by a LiDAR sensor, such as 2D RGB image information collected through a camera, a synthesized multi-view image, and LiDAR and radar information may be utilized. In the future prediction of each modal, a current event may be determined and a future motion may be predicted based on the determined current event. Finally, the future prediction may be performed by mixing the future predictions of multiple modals.

As described above, various embodiments of the present disclosure are based on the object future prediction network. Embodiments of the present disclosure may i) perform multi-view synthesis using multi-view provided by a LiDAR sensor, ii) perform object future prediction using the synthesized multi-view, and iii) perform multimodal prediction using the image information and the LiDAR information. In some embodiments, methods such as a structure of adding the multimodal and an attention structure may be when the multiple modals are mixed are. Further, a final synthesis method using a probability distribution may be performed. Therefore, it is possible to overcome the limitation of the image information of the limited viewing angle and effectively mix the multimodal through the proposed attention structure between the modal. It is thus possible to efficiently predict the future position of the object.

A final synthesis method, according to an embodiment, is described in more detail with reference to FIGS. 7 to 9, and FIG. 10 is a schematic view of the final synthesis method, according to an embodiment.

Disclosed herein is a method of predicting future positions of surrounding vehicles and pedestrians by an autonomous traveling prediction system apparatus using a video (egocentric view) acquired from the view of a traveling vehicle.

In an embodiment, an object position prediction network first estimates several candidate positions where each object may be present in consideration of backgrounds and attributes of the object at a future time point in consideration of an ego-motion of the vehicle.

In other words, position of a specific object at a future time point may be predicted using multi-view based on learning after collecting image information from a past time point, ego-motion information of the vehicle, and LiDAR information from the past time point, and performing a certain processing therefor.

In an embodiment, the object position distribution prediction network may finally estimate the future position by predicting a probability distribution of a future position of each object. In an example, two networks are based on ResNet-50. In the present disclosure, it is possible to improve the accuracy of the object future prediction by additionally using multimodal information in the object position distribution prediction network.

FIG. 8 is a diagram for describing an operation of predicting the position of an object in more detail, according to an embodiment. Referring to FIGS. 7 and 8, an RGB video image acquired through a camera of a traveling vehicle may be extracted (S11). A semantic segmentation image may then be extracted from the extracted RGB video image information (S12, not shown in FIG. 7). A static semantic segmentation image obtained by deleting dynamic objects such as vehicles and pedestrians may be estimated and extracted (S13). This is to understand the attributes of the backgrounds, and the position of the object may then be predicted by identifying the relationship between the attributes of the backgrounds and the attributes of the object (S10). For example, an object with the attribute of a vehicle is positioned on the road, and an object with the attribute of a pedestrian is positioned on the sidewalk. In this process, an ego-motion of the vehicle may be collected by the autonomous traveling prediction system apparatus (S14), and a future position of the object may be predicted based on the collected ego-motion, and hypothesis for multiple predicted positions may be derived (S20). For example, hypotheses for a total of 20 predicted positions may be derived (S20).

Referring now to an operation of predicting a position distribution of the object illustrated in FIGS. 7 and 9, the object position distribution prediction network may receive, for example, video image information frames of 0.3 seconds ago (or another time such as 0.15 seconds ago), and a current time point (S31) to predict the future position of the object, for example, 0.3 seconds later. In embodiments, an interval for past input and future output times may be adjusted depending on technical goals. In an example, the object position distribution prediction network may receive three past RGB images, three semantic segmentation images (S32), three mask images obtained by imaging attribute information of the object and the position of the object (S33), ego-motion information of the vehicle (S34), and twenty hypotheses (S20) output from the operation of predicting the position of the object (S10), and may derive twenty new hypotheses (S35). A Gaussian mixture probability distribution may then be calculated (S50) by passing the new hypotheses through a fitting network (S40).

Figure 11:
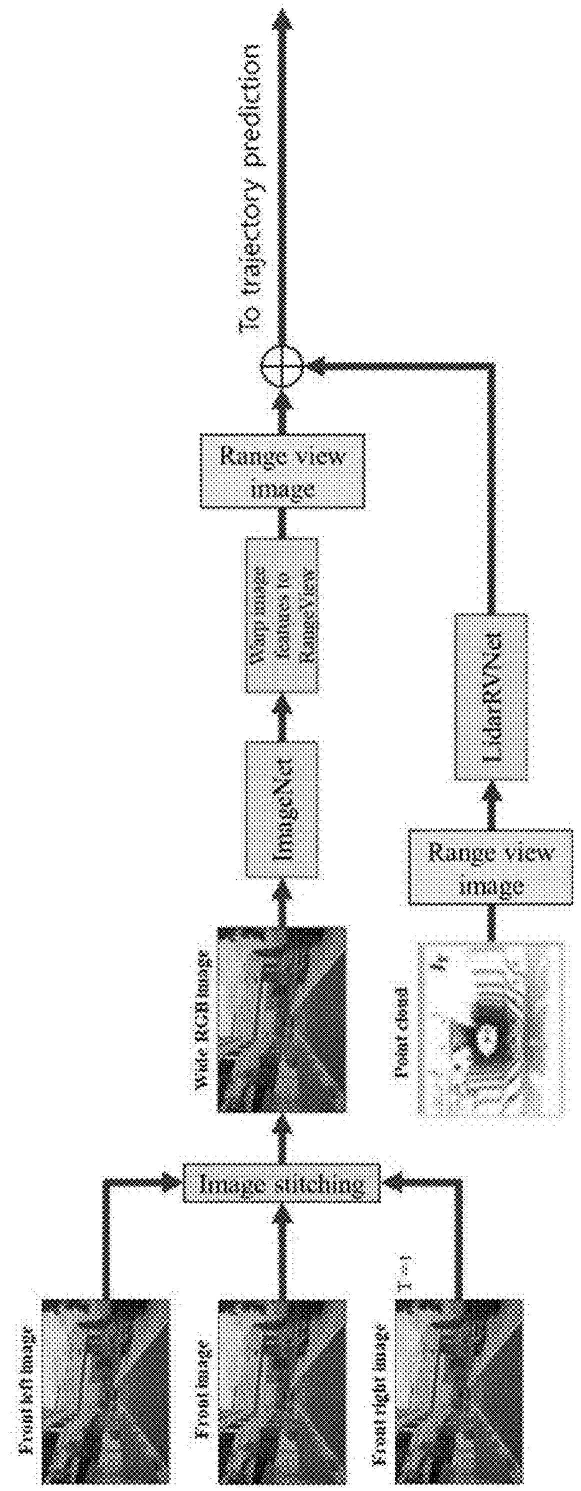
FIGS. 11 to 13 show a process of mixing a multimodal.
Figure 12:
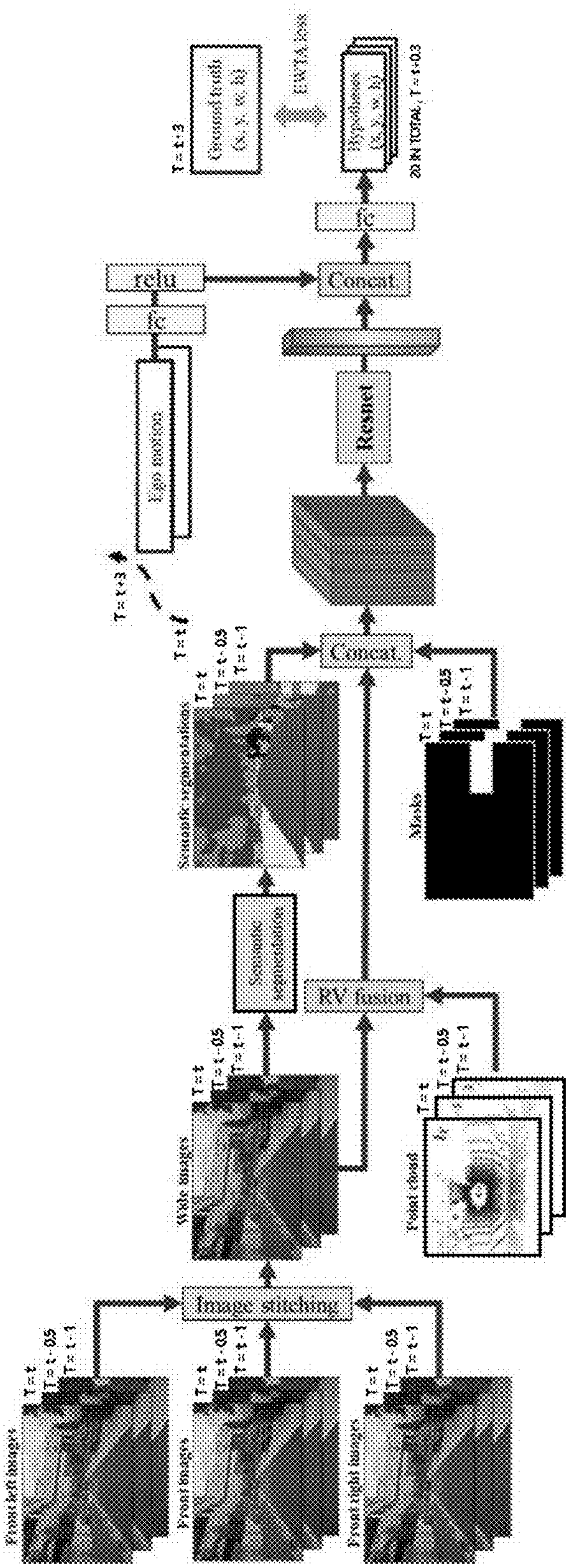
Figure 13:
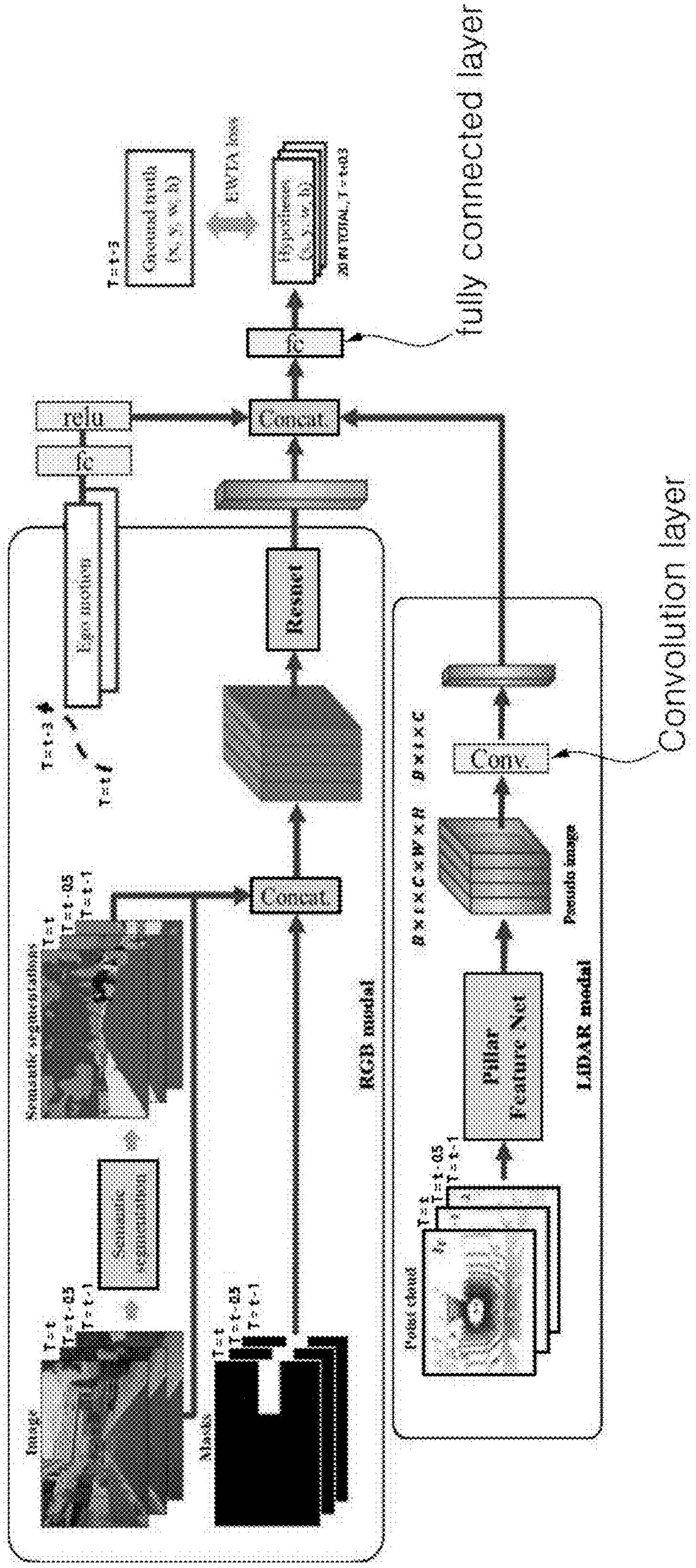
Figure 14:
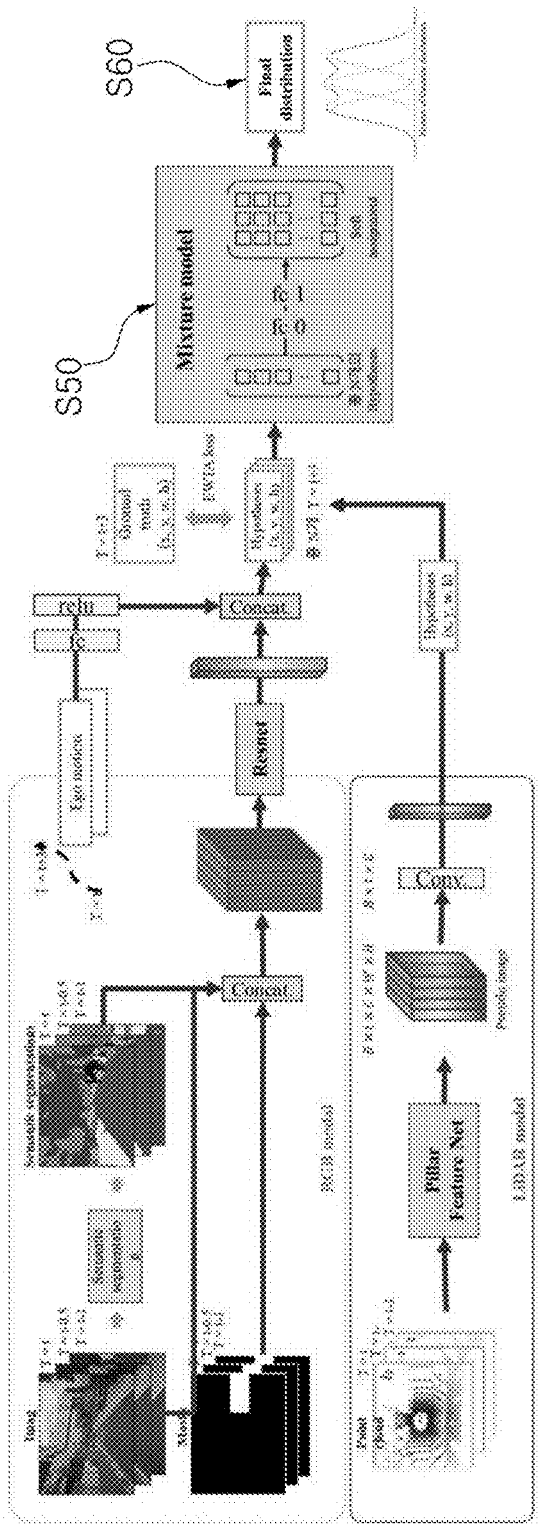
FIGS. 14 and 15 show a method of predicting a position of an object at a future time point using a multi-view image.
Figure 15:
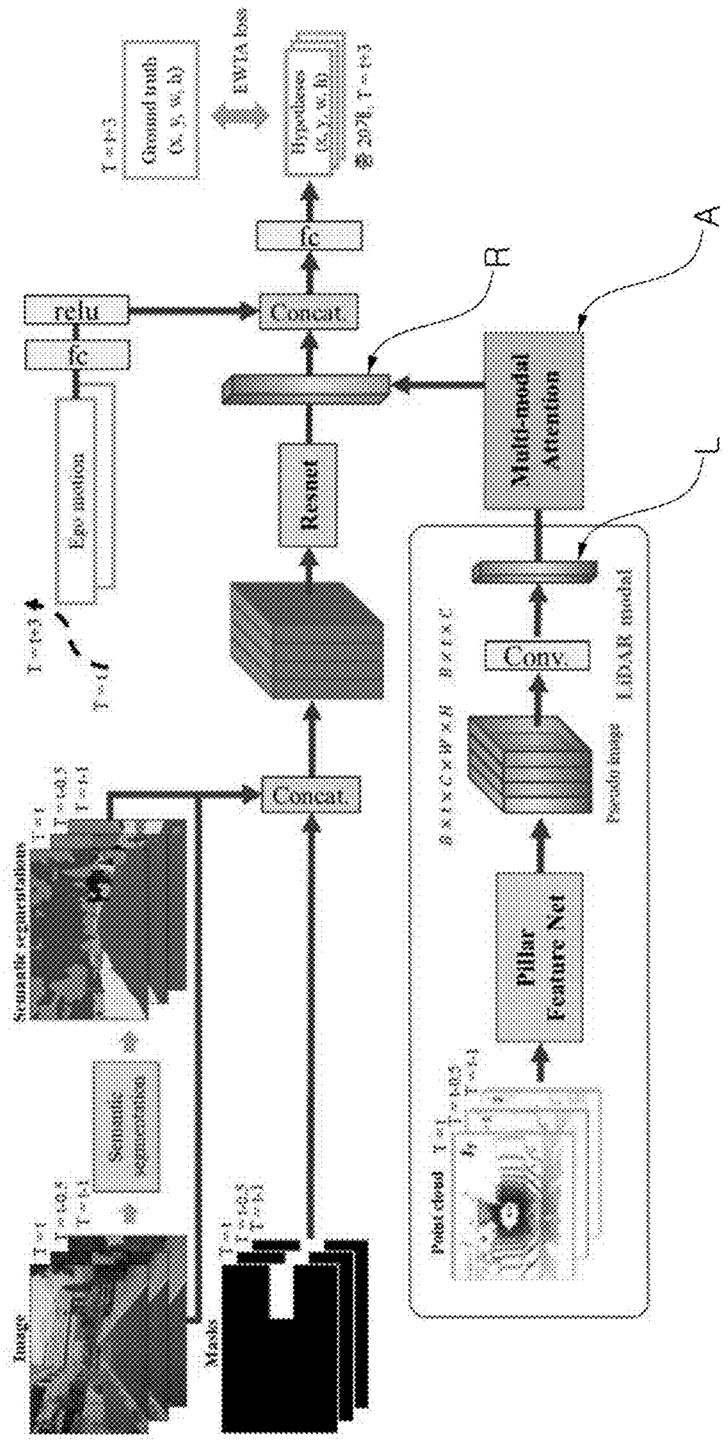

FIGS. 11 to 13 show a process of mixing the multi-modal in a method of predicting position of an object using multi-modal prediction, according to an embodiment FIGS. 14 and 15 show a method of predicting a position of an object at a future time point using a multi-view image, according to an embodiment.

Conventional studies have focused on a direction of synthesizing multi-views based on the bird's eye view. Referring to FIG. 11, the present disclosure proposes a method of synthesizing LiDAR information and RGB 2D image information based on an egocentric view with a wide viewing angle generated by stitching two or more single egocentric view images to generate the egocentric view image. For example, one wide RGB 2D image (wide view image) may be generated by stitching a front left image, a front image, and a front right image. After a feature is extracted by passing the generated image through ImageNet, the feature may be warped to a range view image. In addition, the LiDAR information is configured as the range view image. In an example, the LiDAR information may be passed through a LidarRVNet, and then range view fusion with the previously generated range view image may be performed. This is used for predicting routes below.

FIG. 12 shows an example of the input factor and network configuration described above, according to an embodiment. In the structure, the multi-view image is generated using two or more single view images, and the future of the object is predicted using the multi-view image. As shown in FIG. 12, the multi-view image may be generated by synthesizing the image with the wide viewing angle and the LiDAR information using the front left image, the front image, and the front right image. In some examples, various views may also be used to synthesize different viewing angles. After the image with the wide viewing angle is synthesized, the future prediction may be performed using the conventional method of predicting the future object.

Figure 1:
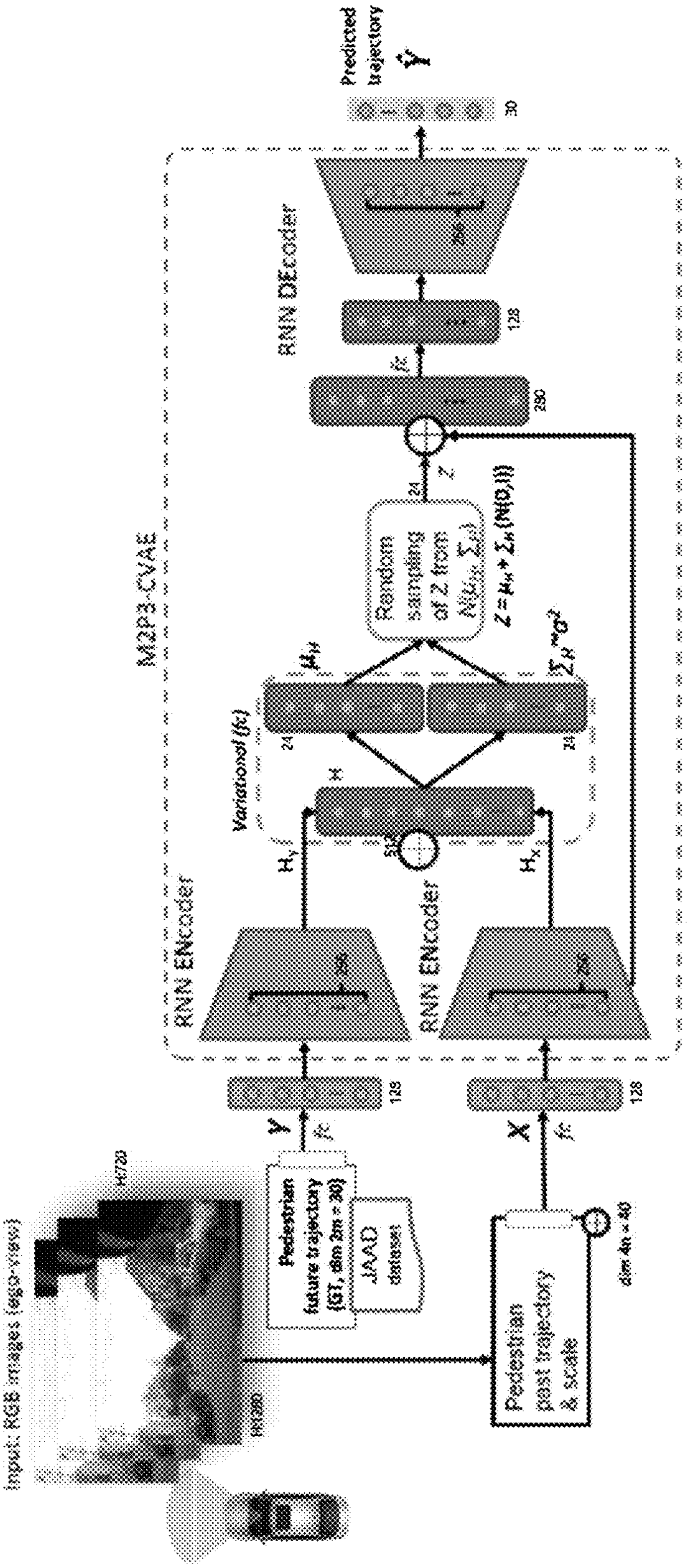
FIGS. 1 to 5 show methods of predicting the future in a conventional autonomous vehicle.
Figure 2:
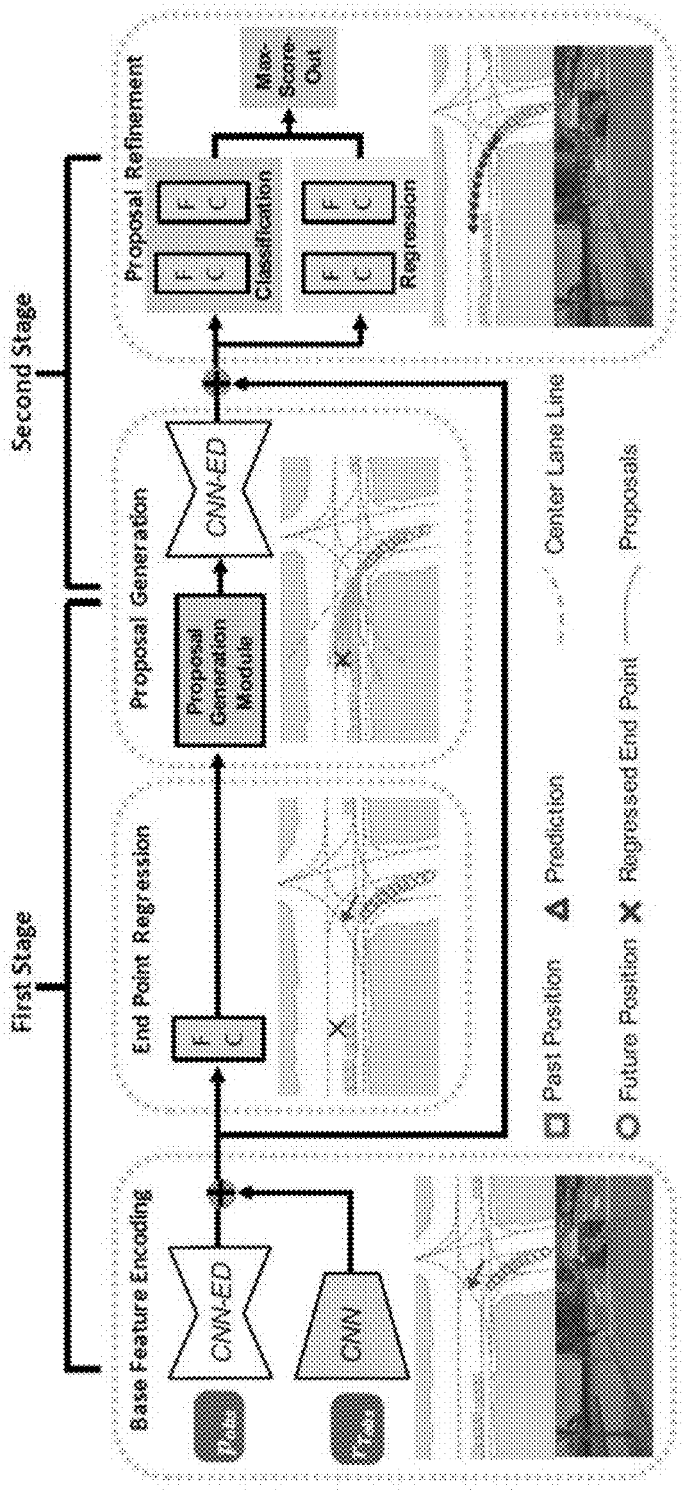
Figure 3:
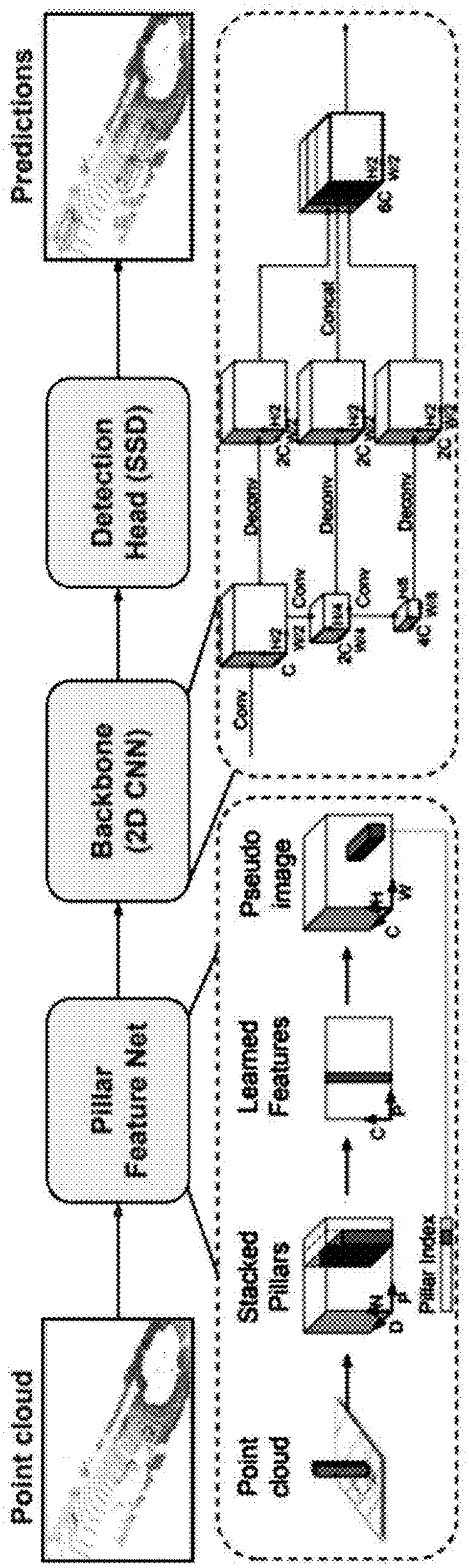
Figure 4:
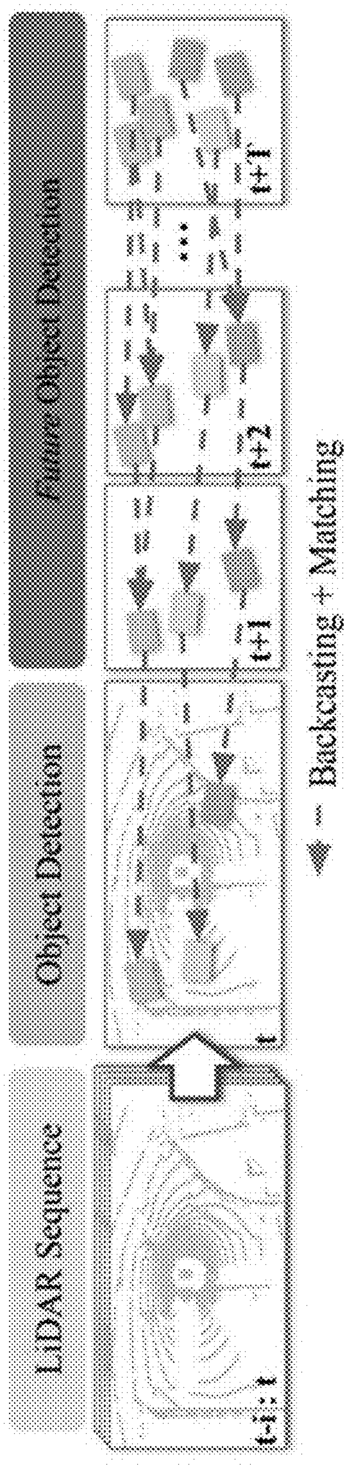
Figure 5:
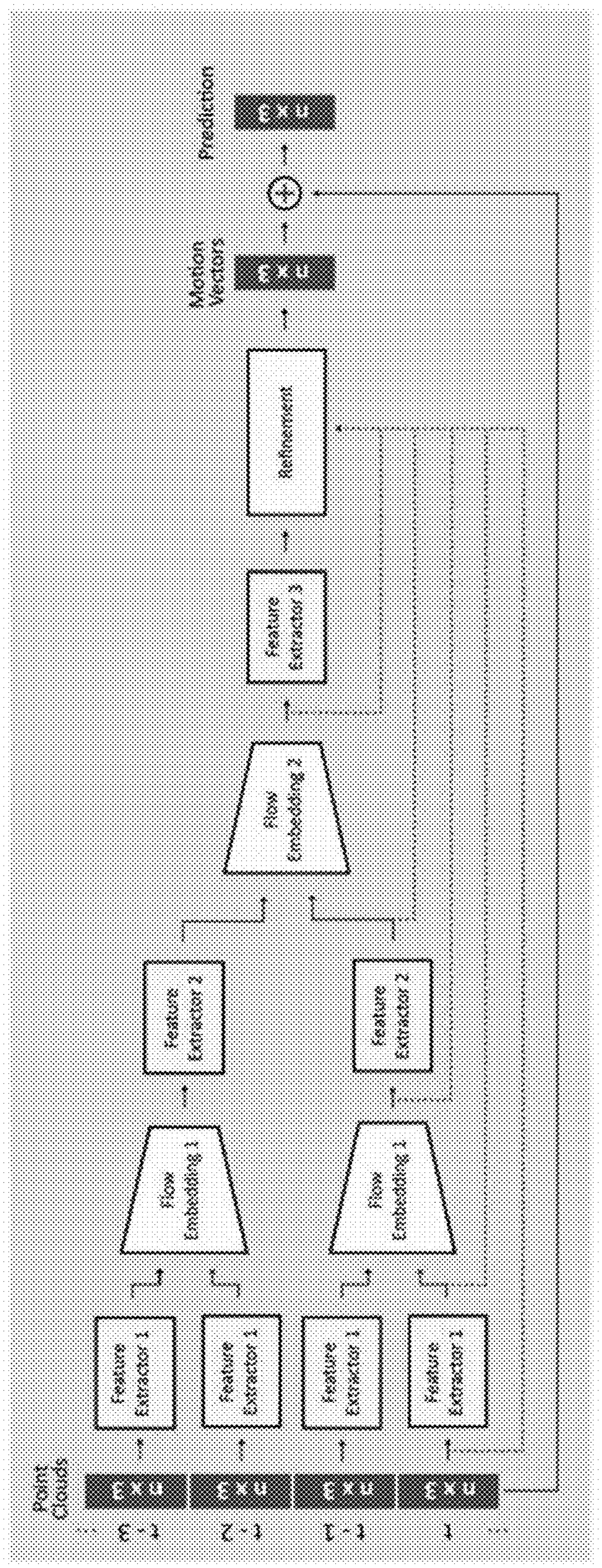

As described above, in the present disclosure, the LiDAR information in addition to the 2D image is used to solve the problem that the 2D image has a limited viewing angle. Therefore, a multi-modal prediction composed of images and LiDAR information is achieved, and thus future objects are predicted. In various embodiments, a method of processing the LiDAR information as shown in FIGS. 3-5 may be selected. A final result value may be obtained by mixing an output value obtained by processing the LiDAR information and an output value obtained by using RGB images. In various examples, a multi-view RGB network as shown in FIG. 12 may be used, or a network using a single RGB image may be used.

FIG. 13 shows an example of a network for processing the LiDAR information through a pillar feature net using point-pillar, according to an embodiment. A pseudo image having a channel C, a width W, and a height H may be generated from a point cloud composed of (x,y,z) through the point-pillar, and a final vector be generated through a convolution layer. FIG. 13 shows an example of using a network for processing a single RGB image. In an example, a final future position may be predicted by accumulating information of a LiDAR modal in a vector finally output using multiple RGB images and passing a fully connected layer. Alternatively, as in the conventional method, a structure in which a final prediction result probability is simply added when each modal is mixed may be used.

Next, referring to a method of mixing the result of the multimodal into the probability distribution in FIG. 14, when output values of an RGB modal and a LiDAR modal are mixed, a Gaussian mixture probability distribution may be generated (S60) using a mixture model (S50). Soft assignments may be generated and estimated using two fully-connected layers (fc) for the hypotheses of N future positions output from each modal. With the estimated soft assignments, parameters ($\pi_k$, $\mu_k$, $\sigma_k$) of k Gaussian probability distribution models may be calculated. Finally, a Gaussian mixture probability distribution may be generated using the finally calculated mean, variance, and distribution weight.

RGB 2D images have been widely used in previous studies to estimate the future position of the object. The present disclosure describes a method of predicting the future objects in the multi-view situation by fusing several single view images. In an example, three past images are used to estimate the future position. Further, in various embodiments, in addition to the RGB image, one or more combinations of the following factors may be used as an input.

(1) Semantic segmentation image information of past frames may be used. Since the probability and motion speed appearing in the scene may be different according to the object information and attributes of each object, the semantic segmentation image information may reflect the object information.

(2) Similarly, information expressing the information and attributes of the object may be used as an input by generating a mask image specifying a class of the object at a position of a bounding box of the past object.

(3) The range view image obtained by synthesizing the RGB 2D image and LiDAR information may be used. In addition, several past images of each of the semantic segmentation and mask images described above may be concatenated and used as an input.

(4) A planned ego-motion of the vehicle may be used as an input.

(5) Three-dimensional LiDAR characteristic information such as the LiDAR information or the pointpillar may be used as an input.

(6) Road information such as a lane may be used.

In various embodiments, the network using (1) to (6) as an input generates M e.g., 20) bounding box hypotheses through a fully-connected layer. As for learning the network, the network may be learned using an EWTA. The EWTA loss may be expressed as the following expression:

$$L_{FLN} = \sum_{k=1}^{K} w_k l(h_k, \hat{y}),\ l = L2norm$$

where y refers to the ground-truth, and h refers to the estimated hypothesis. The ground-truth and an L2 norm of each hypothesis may be calculated, where w refers to a weight and is 0 or 1. K winners (best hypotheses) may be updated, where K weights are 1, and (M−K) weights are 0. In an example, K is continuously reduced by half from M to 1, and the network is learned so that various hypotheses may be output.

Figure 16:
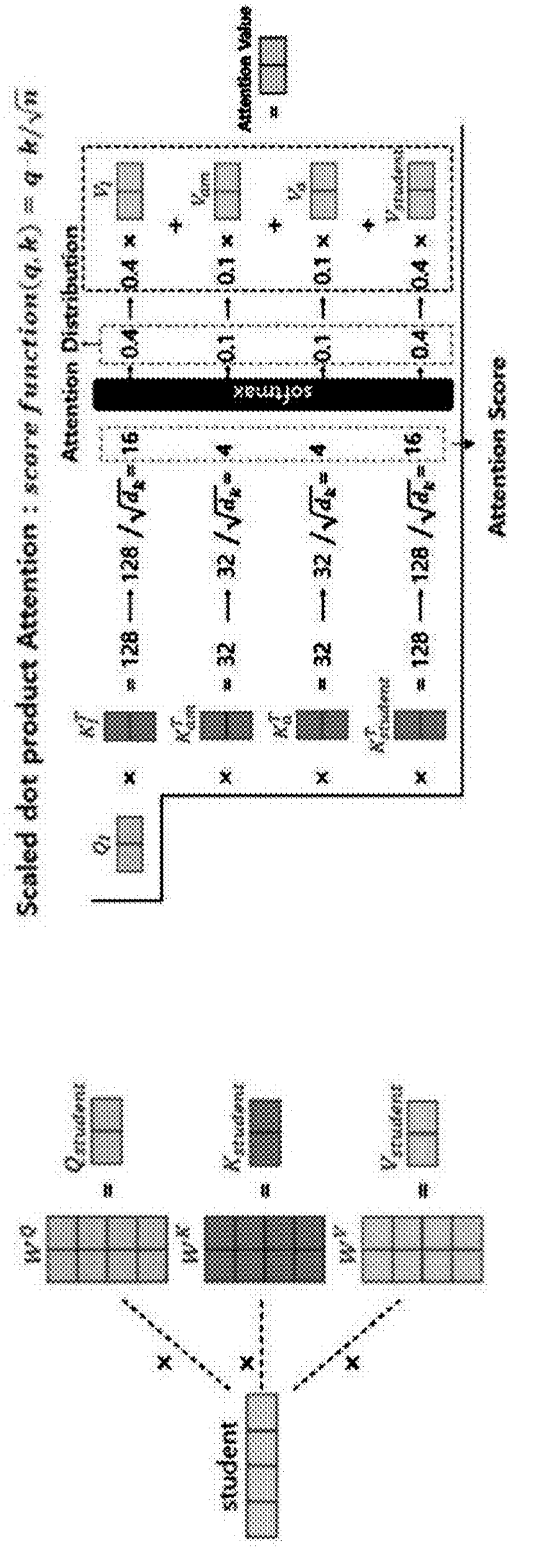
FIGS. 16 and 17 show an attention structure used when the multimodal is mixed.
Figure 17:
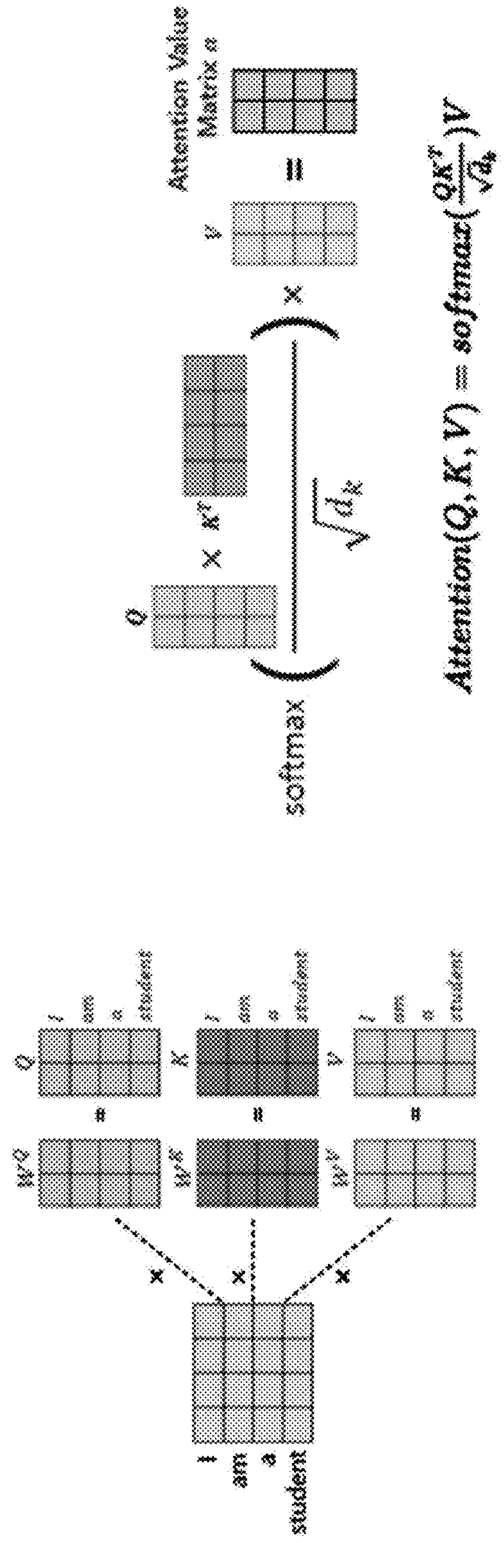

In examples, an attention structure may be used when the multimodal is mixed. FIG. 16 schematically shows the concept of self-attention, according to an embodiment. FIG. 17 shows a process of calculating an actual matrix-based self-attention, according to an embodiment.

In deep learning technology, an attention mechanism is a technique of performing learning to strengthen useful features among calculated features by calculating how much features learned by a current model are related to themselves or other features. The attention mechanism is used from a natural language processing to the deep learning model for an image processing.

The self-attention technique developed from the natural language processing is described below. Main examples below are described using the natural language processing, but may be applied to various sensor data, such as images and videos.

Each word vector of words initially input to an encoder is multiplied by a weight matrix to obtain a query vector, a key vector, and a value vector.

In various embodiments, each of attention scores with all keys for a given Query may be obtained, and then, the corresponding similarity may be used as a weight and reflected to each value mapped with the key. Finally, the attention value may be obtained by weight-summing all the values to which the similarity is reflected.

Referring to FIG. 16, the example drawing shows a method of calculating the self-attention of a word "student" from an input "I am a student." By multiplying a word vector of "student" by a weight matrix $W^Q$, $W^K$, $W^V$, a query vector, a key vector, and a value vector $Q_{student}$, $K_{student}$, $V_{student}$, respectively, for the word "student" may be obtained. Then, attention scores may be obtained through an expression scorefunction(q,k)=$q \cdot k/\sqrt{d_k}$ by performing a scaled dot-product attention using a dot product of two vectors. A final attention value may be obtained by obtaining the attention scores of $Q_{student}$ and all key vectors, then obtaining an attention distribution, and then using the corresponding similarity as a weight to reflect the similarity to each value mapping the word such as key, and weighting the value vector to which the similarity is reflected.

In an embodiment of the present disclosure, in a method of effectively mixing multiple modals using the attention, multiple modals may be stacked for each channel or processed by adding dimensioned vectors. In an embodiment, the modals are mixed using the attention structure to mix the 2D images and the LiDAR information.

A set of vectors output using the 2D RGB information at a time t is defined as $$X_t^R,$$

and a set of vectors generated from the LiDAR information is defined as $$X_t^L.$$

Both $$x^R \in X_t^R \text{ and } x^L \in X_t^L$$

have the dimensions with the same sizes. Query, key, and value may be set by selecting the following methods, respectively.

The query is set to $$x^R \in X_t^R,$$

the key and the value are set to $$x^L \in X_t^L,$$

and the query is set to $$x^L \in X_t^L,$$

and the key and the value are set to $$x^R \in X_t^R.$$

An output vector may be expressed as the following expression through the attention weight expressed as A(•, •) with respect to a Kth key in $\Omega_q$.

$$y_q = \sum_{k \in \Omega_q} A(\Phi_Q(x_q), \Phi_K(x_k)) \cdot \Phi_V(x_k)$$

$\Phi_Q$, $\Phi_K$, $\Phi_V$ is a linear layer for processing the values of the query, the key, and the value. By calculating a query-key value through the attention weight, a weight sum is obtained with a value with the highest similarity. The final prediction is performed using the output value obtained through the above expression.

FIG. 15 shows an attention structure used for multi-modal prediction, according to an embodiment. More specifically, FIG. 15 shows an example of a network mixed through the similarity between a vector L output from a LiDAR modal and a vector R output from an RGB modal using a deep learning-attention structure A, according to an embodiment.

As publicly known in the art, some of example forms may be illustrated in the accompanying drawings from the viewpoint of function blocks, units, parts, and/or modules. Those having ordinary skill in the art should understand that such blocks, units, parts, and/or modules are physically implemented by electronic (or optical) circuits such as logic circuits, discrete components, processors, hard wired circuits, memory devices and wiring connections. When the blocks, units, parts, and/or modules are implemented by processors or other similar hardware, the blocks, units and modules may be programmed and controlled through software (for example, codes) in order to perform various functions discussed in the present disclosure. Furthermore, each of the blocks, units, pars and/or modules may be implemented by dedicated hardware or a combination of dedicated hardware for performing some functions and a processor for performing another function (for example, one or more programmed processors and related circuits.

The present disclosure has been described above with reference to the accompanying drawings, but is not limited to the described embodiments, and it should be apparent to those having ordinary skill in the art that the present disclosure may be variously modified and changed without departing from the spirit and scope of the present disclosure. Therefore, the modified examples or changed examples should be included in the claims of the present disclosure, and the scope of the present disclosure should be construed based on the appended claims.

What is claimed is:

1. A method of predicting a position of an object at a future time point in a vehicle, the method comprising:

extracting, by a processor, a video image acquired through a camera of the vehicle;

predicting, by the processor, a position distribution of the object for deriving a plurality of hypotheses for a prediction position of the object at the future time point based on the video image;

performing, by the processor, a fitting using learned data with respect to the plurality of hypotheses derived by predicting the position distribution of the object; and generating, by the processor, a mixture model, wherein generating the mixture model includes mixing the plurality of hypotheses derived from the video image for a prediction position of the object at the future time point and an output value for a prediction position of the object at the future time point of a LiDAR model based on LiDAR information, by i) extracting a first final vector corresponding to the plurality of hypotheses derived from the video image and a second final vector corresponding to the output value of the LiDAR model, wherein the first final vector and the second final vector have dimensions of the same size, and ii) synthesizing the first final vector and second final vector using a deep learning-attention mechanism, wherein the deep learning-attention mechanism is configured to calculate an attention weight by assigning a query to one of the first final vector and the second final vector and assigning a key and a value to the other one of the first final vector and the second final vector, to generate the mixture model representing a probability distribution of a future position.

2. The method of claim 1, wherein the video image comprises a wide view image obtained by extracting and stitching two or more video image information acquired through the camera of the vehicle.

3. The method of claim 2, wherein:

the wide view image is an RGB two-dimensional (2D) image, and the method includes predicting routes using a multi-view synthesizing the RGB 2D image and the LiDAR information based on an egocentric view.

4. The method of claim 3, wherein the mixture model is generated by mixing output values of an RGB 2D model based on the video image and the LiDAR model based on the LiDAR information.

5. The method of claim 4, further comprising generating a Gaussian mixture probability distribution using the mixture model.

6. The method of claim 1, further comprising, prior to predicting the position distribution of the object, mixing, by the processor, the video image, semantic segmentation image, mask image, and ego-motion information of the vehicle, wherein the ego-motion information of the vehicle comprises information corresponding to a current time point t and a future time point (t+Δt).

7. The method of claim 1, wherein the video image is extracted for a current time point t and a plurality of past time points.

8. The method of claim 1, further comprising, prior to extracting the video image acquired through the camera of the vehicle, predicting a position of the object, wherein predicting the position of the object includes deriving a plurality of hypotheses from video images extracted at a current time point t acquired through the camera of the vehicle.

9. The method of claim 8, further comprising mixing the video image and ego-motion information of the vehicle, including mixing the plurality of hypotheses of the predicting the position of the object.

10. The method of claim 8, wherein the plurality of hypotheses of the predicting the position of the object are derived from one or more video images among the video images extracted at the current time point t acquired through the camera of the vehicle, semantic segmentation image extracted at the current time point t, and ego-motion information of the vehicle.

11. The method of claim 1, further comprising:

prior to predicting the position distribution of the object, extracting, by the processor, the video image as a semantic segmentation image, extracting, by the processor, a mask image imaging an attribute and position information of an object present in the video image, and mixing, by the processor, the video image, the semantic segmentation image, the mask image, and ego-motion information of the vehicle.

* * * * *